United States Patent [19]

Jackson

[11] Patent Number: 4,664,340
[45] Date of Patent: May 12, 1987

[54] VEHICLES

[75] Inventor: Alistair J. Jackson, Tokyo, Japan

[73] Assignee: Imperial Chemical Industries PLC, Welwyn Garden City, England

[21] Appl. No.: 701,223

[22] Filed: Feb. 13, 1985

[30] Foreign Application Priority Data

Feb. 23, 1984 [GB] United Kingdom ............... 8404752

[51] Int. Cl.$^4$ ............................................. B64C 13/20
[52] U.S. Cl. .................................. 244/76 R; 244/136; 244/17.13
[58] Field of Search ..................... 244/136, 76 R, 177, 244/180, 23 R, 17.13; 364/432, 434, 435, 456; 367/124, 129, 126; 340/967, 974, 975; 180/116, 117, 118

[56] References Cited

U.S. PATENT DOCUMENTS

| | | | |
|---|---|---|---|
| 2,941,753 | 6/1960 | Ripper | 244/136 |
| 3,053,480 | 9/1962 | Vanderlip | 244/17.13 |
| 3,101,919 | 8/1963 | Madon | 244/23 R |
| 3,190,590 | 6/1965 | Ripper et al. | 244/136 |
| 3,341,125 | 9/1967 | Sweeney et al. | 244/136 |
| 4,234,924 | 11/1980 | LaVance et al. | 244/136 |

FOREIGN PATENT DOCUMENTS 39-25328 11/1964 Japan.
999954 7/1965 United Kingdom.

OTHER PUBLICATIONS

Proc. 4th Int. Agric. Aviation Congress (Kingston 1969) P. S. Moller, "A New Concept in Airborne Vehicles".
Proceedings of the Section International Conference on Remotely Piloted Vehicles Bristol University Royal Aeronautical Society-Apr. 1981, "The Control and Guidance Unit for Machan".

Primary Examiner—Galen Barefoot
Assistant Examiner—Rodney Corl
Attorney, Agent, or Firm—Cushman, Darby & Cushman

[57] ABSTRACT

A stabilization system for hover vehicles, for example free-flying or cable-controlled helicopters or ducted fan vehicles. The system includes at least one downwardly directed sensor which generates a signal representing the distance from the ground of a predetermined location on the vehicle. The signal from one or more sensors is used to control the height of the vehicle above the ground. Signal from a pair of sensors are used to control the attitude of the vehicle relative to the ground.

20 Claims, 8 Drawing Figures

VEHICLES

This invention relates to systems for stabilising hover vehicles.

There has recently been a considerable increase in the use of ultra-low-volume (ULV) spraying in agriculture. The former practice of high-volume spraying involved diluting pesticides with large volumes of water prior to use. This has disadvantages; in particular, water is not readily available in all situations, and even where it is available, considerable effort is necessary to transport it through the crop. At application rates of 0.5–2 liters per hectare, for example, one man can comfortably carry sufficient pesticide to treat a substantial area, provided ULV formulations are used; but a vehicle such as a tractor will be needed if high volume application at rates of say 200–1,000 liters/hectare is used. Not only does a tractor used unnecessarily constitute a waste of capital and fossil fuel energy; in some circumstances its use may damage the crop. To take the case of paddy rice, for example, once the field is planted entry with a vehicle is quite impracticable. Moreover, even walking through the crops with a hand-held sprayer is difficult, particularly during the second half of the growing season.

In the circumstances, it is advantageous to use an airborne vehicle, particularly a remotely controlled hover vehicle, which enables a crop or other target area for spraying to be treated without the need for wheeling a vehicle through the crop, or even to enter the crop at all, in some cases. With ULV spray, such vehicles can readily carry the weight of spraying liquid required to treat an area of one or two hectares. There is, however, a problem in maintaining the vehicle at the correct attitude and height with respect to the ground.

According to the present invention there is provided a stabilising system for a hover vehicle which is adapted to hover close to the ground, the system comprising at least one downwardly directed sensor which is mounted at a predetermined location on the vehicle and is adapted to generate a ground distance signal representing the distance of that location from the ground, means for detecting the ground distance signal from the sensor and generating a command signal, and means responsive to the command signal from the detecting means for moving the vehicle towards a predetermined position relative to the ground.

A system according to the invention is particularly suited to use with vehicles used in the electrostatic spraying of crops. In such uses the body of the vehicle will additionally carry a high voltage generator for charging the liquid.

The vehicle is useful in many situations where walking through crops is difficult or impossible. It may be useful with tall crops. It is particularly well suited to use in paddy rice.

The invention will now be described, by way of example, with reference to the accompanying drawings, in which.

Figure 1:
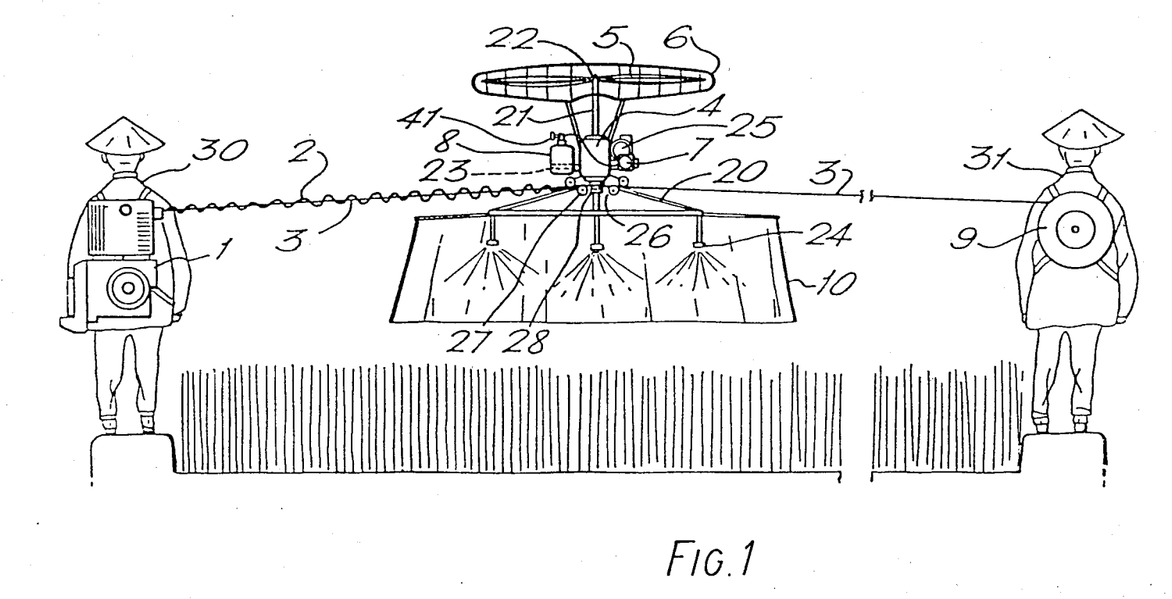
FIG. 1 represents an end view, partly in section, of a vehicle including a stabilising system according to the invention in operation over a paddy field.

Referring initially to FIG. 1, a hover vehicle adapted to be controlled by two operators comprises a frame 20 supporting an electric motor 4. The shaft 21 of motor 4 extends upwardly and is fixed at its upper end 22 to a propeller 5, surrounded by a generally cylindrical safety cage 6. The frame 20 further supports a reservoir 8 containing spray liquid 23. The reservoir 8 is connected by liquid conduits and a liquid supply tap (not shown) to a pump 7 and thence to sprayheads 24 suspended from the frame 20. The sprayheads 24 are surrounded by a removable flexible plastics skirt 10 (shown in section) depending downwardly from frame 20. Frame 20 further carries a high voltage generator 25, capable of producing about 25 KV as output; and a cableway 26 comprising four concave-rimmed guide wheels 27 for receiving a wire strand support cable 3 and a brake 28 for clamping the apparatus fixedly to the cable 3.

Motor 4, pump 7 and high voltage generator 25 are supplied with power from power cable 2 which includes an earth return wire. Power cable 2 is coiled around support cable 3 in the form of a resilient flexible large-coil spring, which at maximum extension is nearly as long as support cable 3. Power is supplied to power cable 2 by a combined petrol engine and electrical generator 1 supported on the back of an operator 30, or alternatively on a sledge or barrow (not shown).

In operation, the vehicle is brought to the edge of an area which it is desired to spray, e.g. a paddy field. Cableway 26 is adjusted to an appropraite position on support cable 3 and locked in that position by means of brake 28. Two operators 30 and 31 position themselves on either side of the field with support cable 3 stretched taut between them. Spare cable 3 is coiled on a carrier reel 9 supported on the back of operator 31. Operator 30 opens the liquid supply tap and starts engine/generator 1, whereby electrical power is provided to the spray via power cable 2. This activates pump 7, generator 25 and motor 4. The latter rotates propeller 5 via shaft 21, generating as its speed is increased exactly the correct amount of lift to support the sprayer and the cables 2, 3 leading to it. Cable 3 serves to position the sprayer between operators 30 and 31 and to resist the torque of the rotating propeller 5. Operators 30 and 31 walk down the field at a rate appropriate to the rate at which liquid is supplied from nozzles 24 by pump 7. HT generator 25 meanwhile supplies 25 KV to sprayheads 10, resulting in the production of fine charged spray particles of regular size. These are helped to penetrate into the crop by the downdraft from the propeller 5. At the end of the paddy, operator 30 reduces the speed of engine/generator 1, grounding the sprayer. Cableway 26 is then unlocked and moved along cable 3 towards operator 31, being relocked in position one swath width along the cable 3. Engine/generator 1 is restarted, spraying begins again, and operators 30 and 31 walk back up the paddy field to their starting point. By repeating the process they are able to spray the whole area of the field.

Electric motors suffer from a low power/weight ratio, and electric generators are also heavy and cumbersome (though recent developments in batteries, e.g. lithium/thionyl chloride batteries suggest that it may soon be possible to use high-power batteries to power engines in the device of FIG. 1). Generally therefore we prefer to use petrol-driven motors.

Figure 2:
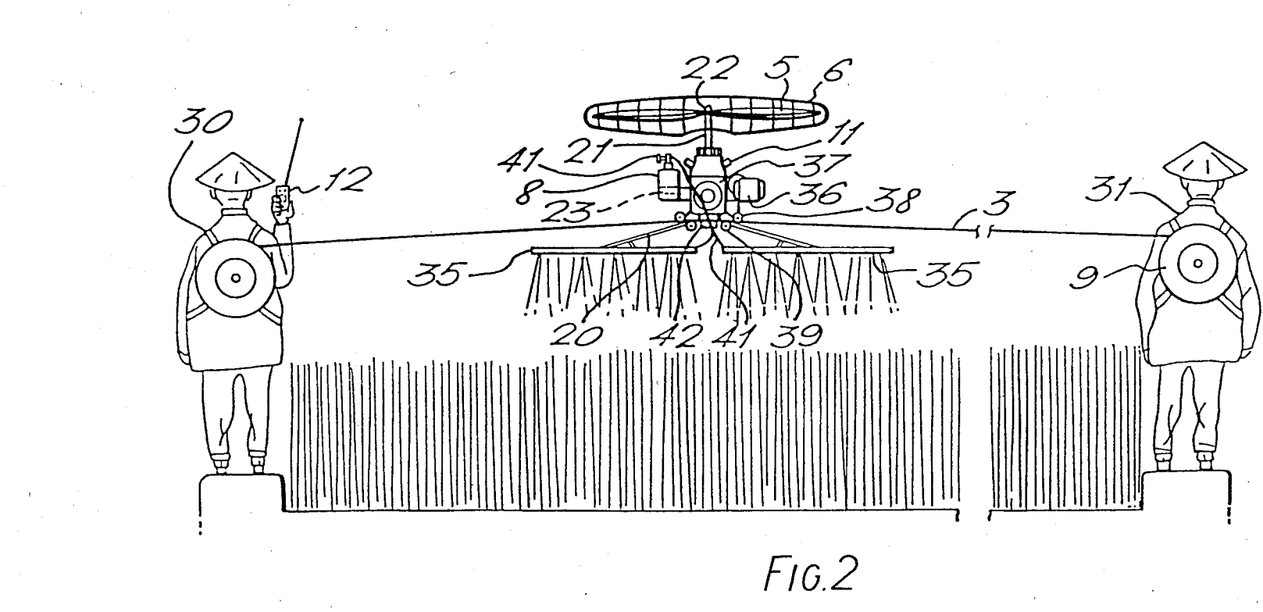
FIG. 2 represents an end view, partly in section, of a second vehicle including a stabilising system according to the invention in operation over a paddy field.

A second remotely controlled hover vehicle is shown in FIG. 2. This is generally similar to the vehicle shown in FIG. 1. Differences are that electric motor 4 is replaced by 3.5 HP, 40 cc two-stroke petrol engine 11. This drives shaft 21 and propeller 5 (diameter: 2 m) as before; its throttle is however controlled by a hand-held radio transmitter 12 carried by operator 30. Spray liquid 23 is carried in reservoir 8 as before; it feeds sprayheads 35 by gravity through a feed pipe and supply tap (not shown) which may either be operated by hand or servo-operated by a control signal from transmitter 30.

The sprayheads 35 are supplied with high potential (25 KV) from a generator 36 powered by engine 11. Generator 36 is earthed via support cable 3. Engine 11 also powers a reducing forward/reverse gearbox 37 which drives wheels 38, 39 in a cableway 42 for cable 3. The overall weight of the device is about 16 kg, including a payload of about 5 kg.

In operation, the vehicle is brought to the rice paddy as before. The operators 30, 31 stand one on each side of the paddy, the engine 11 is started, the supply tap opened and gear box 37 engaged in a forward direction. The thrust from propeller 5 supports the device while cableway 42 drives it slowly across the paddy while spraying the first swath until it reaches operator 31 on the further side. Operator 31 reverses gear box 37, and both operators move one swath width further down the field, so that the device sprays a second swath parallel to the first as it returns to operator 30. By repeating this process the whole field may be sprayed.

The electrostatic sprayheads 24 are of the general type illustrated in FIGS. 7 and 8 of UK Pat. No. 1 569 707, while the sprayheads 35 are of the general type illustrated in FIGS. 12 to 14 of that Patent. The disclosure of UK Pat. No. 1 569 707 is incorporated herein by reference.

As will be apparent, numerous changes in the construction and mode of operation of the above described vehicles are possible and may be advantageous in certain circumstances. Features from the two vehicles can be combined in various ways: e.g. the electrically driven vehicle of FIG. 1 may include the powered cableway and gearbox of the vehicle of FIG. 2 so that it is able to move along the cable 3 under power; the vehicle of FIG. 2 may include a pump to deliver spray liquid (this is generally preferred where suspensions are to be sprayed) or container 18 may be gas-pressurised. The speed at which gearbox 7 drives the cableway may be made variable. It will often be convenient to provide a trailing earth wire from cables 2 or 3 to provide an electrical pathway to earth. If electric power is being used solely to drive the high voltage generator (which in principle requires very little power and can be run off low power dry cells) a pathway to earth through one of the operators may be both sufficient and safe.

Where the vehicle is provided with a powered cableway to drive it along the cable 3, adjustable stops may be positioned on cable 3 at suitable distances from each operator as safety devices to prevent the sprayer overrunning and contacting the operator. Further if desired the gearbox 37 may be provided with means whereby the drive is automatically reversed when the cableway contacts the stop. In this way the sprayer will travel backwards and forwards automatically along the cable 3 without the need for the operators to intervene. It is also possible for the vehicle to be driven along the cable by thrust from its fan.

As an alternative to the powered cableway illustrated, it is possible to use, for example, a cable in the form of a flexible tape, gripped between rubber driving wheels. Where the vehicle has a fixed position on the cable and is moved between the operators by use of the cable, the cable need not be continuous between the operators; it may be in two lengths, linked to opposite sides of the vehicle. In such an arrangement, the vehicle may be moved between the operators by winching. For example, one operator may control a motorised winch for winding in cable, while the other recovers cable using a linear spring; or both operators may have winches.

If desired, the operators may control the sprayer at a distance by means other than the transmitter 12 or the power cable 2. For example, one or more light control lines may be provided, for example, to set the throttle of engine 11; to open or shut the liquid supply tap; to set or release brake 28; or to reverse gearbox 37.

Other ways of operating the vehicles will be apparent. For example, if absolute evenness of spraying is not essential, in the case of the device of FIG. 2 the operators can move slowly but continuously down the field so that there is a continuous small component of forward motion added to the lateral movement of the sprayer. For certain applications (e.g. large glasshouses) operators could be dispensed with, and the device set to run automatically over a pre-set path. It will not always be necessary to ground the sprayer between traverses of the area being sprayed.

If desired, other types of sprayhead (e.g. uncharged spinning discs or cones) may be substituted for the electrically charged sprayheads used in the devices of FIGS. 1 and 2.

Another airborne vehicle suitable for use in spraying crops is disclosed in Japanese Patent Publication No. 39-25328. The vehicle is similar to the vehicles shown in FIGS. 1 and 2 in that it has a rotor and is controlled by an operator on the ground.

Other airborne vehicles which can be used for spraying crops include vehicles having rotors, such as free-flying, remotely-piloted helicopters, and vehicles which employ ducted fans.

Some remotely piloted helicopters are commercially available, such as the C-227 marketed by Canadair and referred to in Proc. of 2nd International Conference on Remotely Piloted Vehicles, Univ. of Bristol, UK; April 1981, p. 5.1.

A suitable vehicle having ducted fans is described by P. S. Moller in Proc. 4th International Agricultural Aviation Congress (Kingston 1969). Such a vehicle is shown in FIG. 3 of the drawings. Referring to FIG. 3, the vehicle includes a generally circular body 71 having a central compartment 73 containing drive motors and control equipment. Angularly spaced about the compartment 73 are eight ducted fans 75, each having adjustable vanes. The fans are driven by respective motors in the compartment 73 under control of a stabilising system also contained in that compartment and hereinafter described.

Commercial vehicles such as the CL-227, having usually been designed for other purposes that require them to have an air speed of about 100 kph and an operating ceiling of several thousands meters, are extremely expensive. Accordingly, it will generally be preferable to use a specially designed vehicle of lower capabilities. In designing such a vehicle, the problem of torque must be kept in mind. A vehicle with a single spinning propeller has substantial angular momentum. If the vehicle rolls or pitches slightly, a restoring moment in direct opposition to the vector of roll or pitch will, due to the gyroscopic effect, produce a couple at right angles to the vector. This makes it difficult to correct any instability of the machine since the application of a force in the direction which seems natural to the operator, for example, by increasing the tension in the guide cable, will cause the vehicle to tilt at right angles to the direction he wants.

In general, vehicles having a rotor mounted on a vertical shaft, such as the vehicles shown in FIGS. 1 and 2 of the drawings and remotely piloted helicopters, are dynamically unstable. If perbertrations to their motion, caused by wind, for example, are not actively corrected, the vehicle inevitably progressively deviates from its "trimmed" condition and crashes.

In this connection, it will be appreciated that such a vehicle, like any other body, has six degrees of freedom of motion i.e. three translational long orthogonal axes x, y and z, and three rotational wx, wy and wz, about respective axes.

Movement in the x or upwards direction can be controlled by adjusting the pitch angle of the rotor blades and/or engine speed. Both can be effected by servo motors, using the stabilisation system according to the invention thereinafter described.

Movement in the y and z directions can be controlled by the operator using a radio transmitter. Forward flight involves changing the pitch angle. Side-slip is corrected by adjusting the roll angle a little away from the vertical to create a sideways, translational component of the thrust from the rotor, again under the command of the pilot.

The wx, wy and wz rotations are most difficult to control manually and it is these which create the need for stabilisation system.

To this end, it is possible to use two contra-rotating propellers to provide lift (the C-227 machine does this) or to provide a counter-rotating shaft or sleeve which balances the angular momentum of the propeller. Combined with suitable adjustment of the position of the centre of gravity, this gives a more stable vehicle in respect of gyroscopic effects.

In order to counter-balance the general rotations wx, wy and wz and to counteract gyroscopic effects, the vehicle may (alternatively or additionally) be provided with a control system. One such system, used in many passenger-carrying helicopters, is that of cyclic pitch control. The pitch of the helicopter blades is varied as they turn through each complete revolution. If the vehicle, having a rotor rotating anti-clockwise (as viewed from above) pitches forward, the control system will increase the pitch on the blade as it passes through the semi-circle to the right of the roll axis and reduce it as it passes through the semi-circle to the left of the roll axis. Changes in pitch produce corresponding changes in lift: the effect of these is to produce a gyroscopic couple acting against the forward pitching movement and tending to restore the system to stability.

Such control systems in passenger-carrying helicopters may be operated by the pilot; in unmanned vehicles they are preferably automatic.

Vehicles having ducted fans are also fundamentally unstable in variable atmospheric conditions. Their behaviour is similar to that of helicopters. If air currents cause a slight differential in the lift from fans on either side of the vehicle, the vehicle will tilt over and begin to fly sideways. This instability will not correct itself without some external assistance.

An automatic system according to the present invention, which is included in the vehicles of FIGS. 1 and 2, will now be described with reference to FIGS. 4, 5 and 6 of the drawings.

Figure 4:
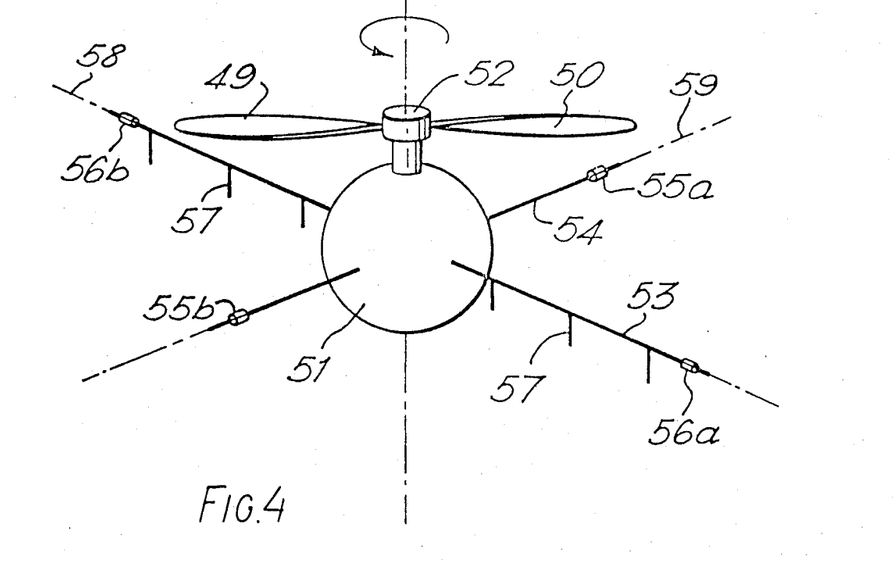
FIG. 4 is a perspective schematic view of the vehicle of FIG. 2 which is used in describing the stabilising system therein.
Figure 5:
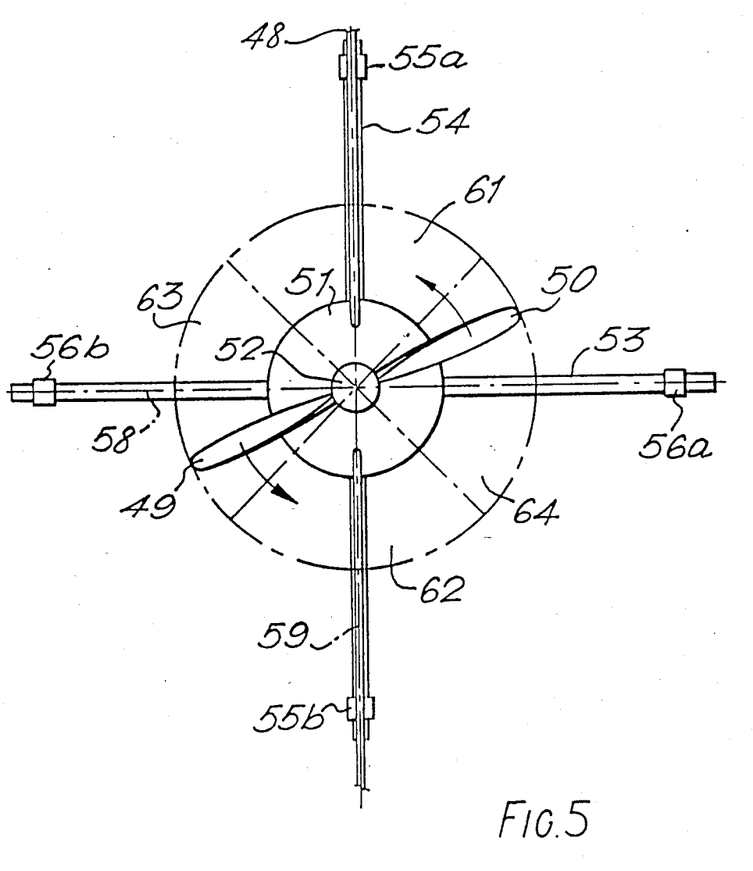
FIG. 5 is a top view of the vehicle of FIG. 4.

Referring to FIGS. 4 and 5, a stabilising system according to our invention comprises a vehicle body 51 carrying within it a spray reservoir and an engine, the engine driving (anti-clockwise, as viewed from above) a shaft 52 carrying two rotor blades 49, 50. These are pivotable about their long axis for pitch control.

Extending through the vehicle body 51 and mounted slidably therein is a vehicle control line 48. Mounted parallel to control line 48 is a sensor boom 54. A first pair of pitch sensors 55a and 55b are mounted at spaced locations on the boom 54, preferably at respective ends thereof. At right angles to sensor boom 54 is mounted spray boom 53, carrying electrostatic nozzles 57 (fed from the spray reservoir by conduits not shown) and at each end thereof a roll sensor 56a, 56b of a second pair of sensors. The pitch and roll sensors 55, 56 are downwardly-directly ultrasonic rangefinding sensors, of the type used in autofocus camera. Each produces a digital electrical signal which represents the distance from the ground, and is sufficiently sensitive to detect differences of ±1%. The signals from each of the pitch sensors 55a and 55b and the roll sensors 56a and 56b are fed to a microprocessor and associated circuits (hereinafter described) which control via a relay the pitch of blades 49, 50.

The microprocessor compares each pair of signals, and detects any difference between the signals. The associated circuits then generate a command signal for use in adjusting the pitch of the blades 49, 50 in each of the four quandrants through which they rotate. The pitch of the blades 49, 50 is controlled in the quandrants 61, 62 whose centre lines lie over the roll axis 59 by the roll sensors 56; and correspondingly in the quandrants 63, 64 whose centre lines lie over the pitch axis 58 by the pitch sensors 55. If the vehicle pitches forward, so that pitch sensor 55a is nearer the ground than pitch sensor 55b, the command signal from the circuits associated with the microprocessor, will be such as to increase the pitch of blades 49, 50 as they pass through quandrant 64, and correspondingly decrease it as they pass through quandrant 63. The effect of this is to remove the difference between the signals from the sensors 55a and 55b.

Similarly, in response to a rolling motion to the right (roll sensor 56a lower than sensor 56b), the command signal will increase the pitch (and hence lift) of blades 49, 50 in quandrant 62 and decrease it in quandrant 61.

At the same time, the system is used to control height. To do this, the microprocessor averages the signal from all four sensors 55, 56. If the distance to ground corresponding to the signal is too small, compared with data representing a predetermined height programmed into the microprocessor, the microprocessor and associated circuits will increase the average or collective pitch (and hence lift) throughout the cycle until the height is correct; and correspondingly reduce this pitch if the height is too great.

Figure 6:
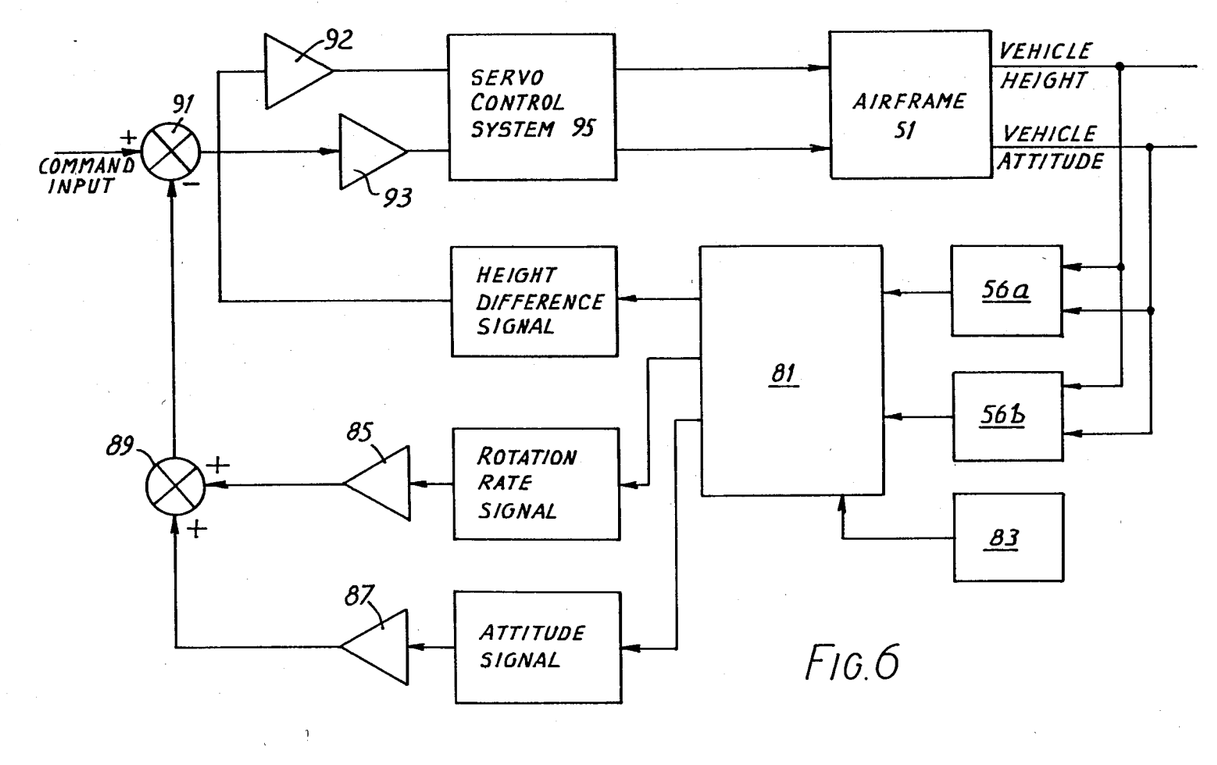
FIG. 6 is a block diagram of the stabilising system of FIGS. 4 and 5.

FIG. 6 of the drawings shows the body 51 of FIGS. 4 and 5 together with the roll sensors 56a and 56b. The pitch sensors 55a and 55b are not shown in FIG. 6 but it will be appreciated that their arrangement in the system and the manner in which they cause operation of the system is the same as for the sensors 56a and 56b.

Referring now to FIG. 6, each of the sensors 56a and 56b has its output connected to the microprocessor referred to above and now designated 81. A clock 83 provides a clock input to the microprocessor 81. The microprocessor is structured in a conventional format. Input signals are first transposed to digital form and then interfaced to the microprocessor. Output signals are interfaced to the control circuit and are transposed to analogue form. The control software and stabilising algorithms (described below) are stored in ROM form.

The microprocessor 81 has three outputs, one supplying a rotation rate signal to an amplifier 85 and another supplying an attitude signal to an amplifier 87, and another supplying a height difference signal to an amplifier 92.

Each of the amplifiers 85 and 87 has its output connected to a respective input of a first summing device 89, whose output is in turn connected to an input to a second summing device 91. The summing device 91 has a second input, which receives a command input signal, as hereinafter described, and an ouptut which is coupled via an amplifier 93 to a servo system 95. An output of the amplifier 92 is also coupled to the servo system 95.

The servo system 95 operates to vary the pitch of the blades 49 and 50, as described above, thereby to vary the attitude and height of the vehicle.

In operation to the system shown in FIG. 4, 5 and 6, the sensor 56a produces a signal representing its distance $h_1$ from the ground and the senors 56b produces a signal representing its distance $h_2$ from the ground. These signals, together with a clock signal from the clock 83, are applied to the microprocessor 81.

The microprocessor 81 effects three operations on these signals.

First, it generates a signal representing the attitude, $\alpha$, of the boom 53 upon which the sensors 56a and 56b are mounted. This attitude signal is derived from the algorithm:

$$\alpha = \sin^{-1}\left(\frac{h2 - h1}{x}\right)$$

where x is the spacing between the two sensors.

Secondly, the microprocessor 81 generates a rotation rate signal, $d(\alpha)/dt$, which is given by the algorithm:

$$\frac{d(\alpha)}{dt} = \Delta\left[\frac{\sin^{-1}\left(\frac{h2 - h1}{x}\right)}{\Delta t}\right]$$

where $\Delta t$ is the time between spot measurements of $h_1$ and $h_2$.

Thirdly, the microprocessor 81 generates a third signal representing the difference between the height h of the vehicle above ground, given by the algorithm: $h = \frac{1}{2}(h2 + h1)$, and the predetermined height programmed into the microprocessor.

The rotation rate signal and the attitude signal are amplified by respective amplifiers 85 and 87 and the amplified signals are applied to respective inputs of the first summing device 89. A signal representing the sum of the attitude and rotation rate signals is then applied to the second summing device 91.

At this stage it will be appreciated that attitude and rotation rate signals are generated as soon as the boom 53 has moved from a horizontal position. The attitude signal persists as long as the boom 53 is inclined to the horizontal and the rotation rate signal persists as long as the boom is rotating.

When the vehicle first deviates from trim there is therefore a summed signal from the first summing device 89 which, when applied to the servo system 95 as hereinafter described, results in a strong restoring torque to restore trim. When the vehicle is moving back towards the correct trim, however, the rotation rate signal is opposed to the attitude signal and the restoring torque is reduced. In fact, as the vehicle approaches the trim position, the resultant torque may actually oppose the motion of the vehicle, thus acting as a strong damping force. This damping is valuable as it enables the vehicle to move slowly into the trim position. Without damping the vehicle would have maximum angular velocity as it passed through the trim position and oscillations may result.

Referring again to FIG. 6, the second summing device 91 receives the summed signal from the device 89 and a command signal which is generated by an operator-controlled device. This command signal represents a desired attitude for the boom 53, which may or may not be horizontal. The device 91 generates a control signal representing the difference between the command signal and the signal from the device 89. The control signal is amplified by the amplifier 93 and applied to the servo system 95, which operates to vary the pitch of the blades 49 and 50, as described above. Signals are applied to the servo system 95 until the boom 53 has returned to the attitude corresponding to the command signal applied to the summing device 91.

The height differences signal from the amplifier 92 causes the servo system 95 to operate to vary the collective pitch of the blades 49 and 50 and/or the engine speed so as to restore the vehicle to the predetermined height programmed into the microprocessor 81.

It will be appreciated that other representations of attitude can be used in the microprocessor in place of the Cartesian co-ordinates discussed above, for example, Euler angles etc. There are also many numerical methods for differentiating signals other than the algorithms referred to above.

The stabilising system shown in FIGS. 4, 5 and 6 has no means for controlling yaw since the vehicle could rotate about a vertical axis without changing the signals generated by the sensors 55a, 55b, 56a and 56b. Yaw control can be assisted, however, by conventional means such as a low-cost rate gyro. This can remove the torque creating the yawing motion but has no absolute heading reference to enable the command heading to be re-set. In a single rotor helicopter this problem can be overcome by adjusting the pitch of the tail rotor blades (and hence the thrust from the tail rotor) via a servo system commanded by an operator using a radio transmitter.

The stabilising system described above would give rise to a problem if the vehicle is travelling over uneven ground. A particular example is the bund wall at the edge of the paddy field. Thus, if one of a pair of sensors is moved above the wall it generates a signal representing a shorter distance from the ground than does the signal from the other sensor in the pair. The microprocessor 81 will then generate signals which cause the vehicle to be tilted so as to raise that part of the vehicle which is above the wall. Aberrant flight characteristics will then result, in some cases causing the vehicle to decelerate abruptly and possibly fly in the reverse direction.

Figure 7A:
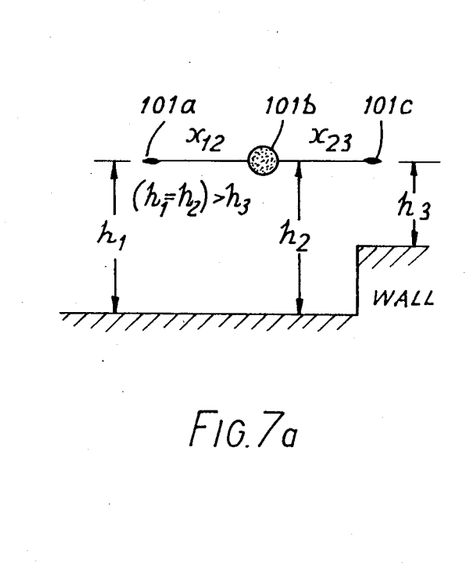
FIGS. 7a and 7b show diagrammatically a vehicle including a modification of the system of FIGS. 4, 5 and 6.
Figure 7B:
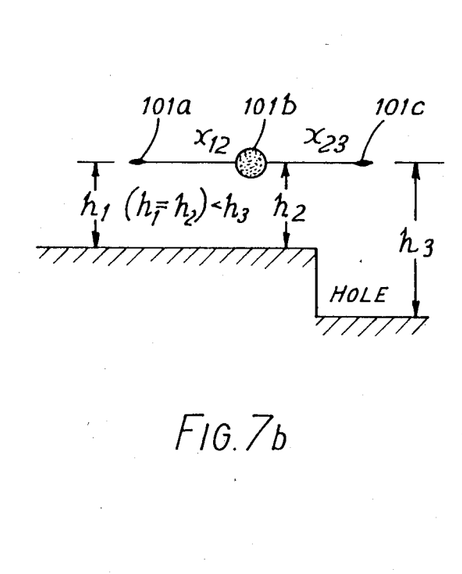

To overcome this problem, the system of FIGS. 4, 5 and 6 can be modified as shown in FIGS. 7a and 7b. In this modified system, each pair of sensors 55a, 55b and 56a, 56b is replaced by a group of three sensors which are mutually spaced and collineraly arranged. FIGS. 7a and 7b show one such group of three sensors 101a, 101b and 101c.

If the vehicle is located above horizontal ground, $$\frac{h2 - h1}{x_{12}} = \frac{h3 - h2}{x_{23}} \text{ and } \alpha = \sin^{-1}\left(\frac{h3 - h1}{x_{12} + x_{13}}\right)$$

If an outer sensor 101c is above a wall, as shown in FIG. 7a, h1=h2>h3. Accordingly, the microprocessor is programmed to act upon the signals from the sensors which are equally or approximately equally spaced from the ground, i.e. the other outer sensor 101a and the central sensor 101b. The height control is based upon the signal corresponding to h1 and h2.

If one of the sensors 101c is above a hole, as shown in FIG. 7b, h1=h2<h3, the microprocessor is again programmed to act upon the signals from the sensors 101a and 101b and the height control is based upon the signal corresponding to h1 and h2.

The desired height is programmed in the software containing the stabilisation algorithms or, alternatively, by means of appropriate circuitry, could be input by a variable control or by a magnetic strip card and reader, or a bar-code strip and reader, etc.

In principle, the central sensor 101b can be omitted and the signal generated by that sensor replaced by a signal representing the average distance from the ground of the two sensors disposed on the arm perpendicular to the arm or boom upon which the sensors 101a and 101c are mounted.

The stabilisation system described above includes an automatic height control, though this can be realised in principle with just a single sensor. Automatic height control is all that is required for the vehicle described in the above-mentioned Japanese Patent Publication No. 39-25328.

Figure 3:
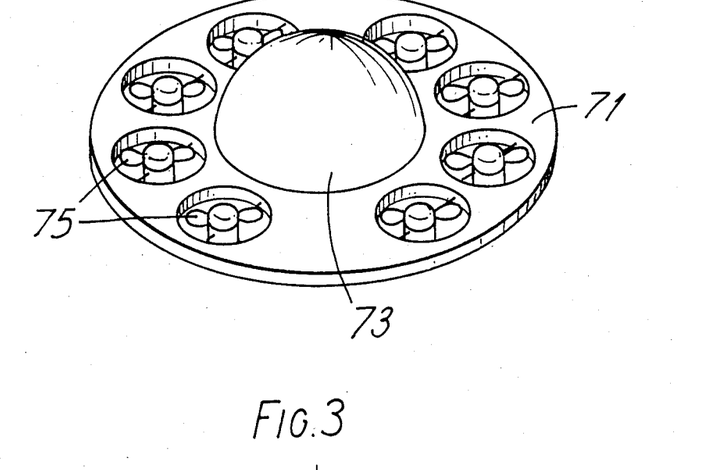
FIG. 3 is a perspective schematic view of a third vehicle including a stabilisation system according to the invention.

It will be appreciated that the system shown in FIGS. 4, 5 and 6 and the modified system shown in FIGS. 7a and 7b can be used to stabilise the attitude and height of the other airborne vehicles referred to above. In particular, for vehicles having ducted fans, as shown in FIG. 3, the control signal from the amplifier 93 of FIG. 6 is applied to servo motors which effect differential modulation of the thrust from the fans 75 or which control adjustable vanes in the fans. These operations create rotational moments which are needed to stabilise the vehicles attitude. The control signal from the amplifier 92 is applied to servo motors which modulate the thrust from the fans 75 or adjustable vanes in the fans by the same amount.

As well as ultrasonic range-finders, infra-red, radar or other range-finders may also be used in the systems described above.

It is possible to operate the system of FIGS. 4, 5 and 6 with three sensors only, i.e. a first pair of sensors and a further sensor on a line perpendicular to and bisecting the line joining the first pair of sensors. For example, the three sensors may be located at the corners of an equilateral or isosceles triangle whose base is the pitch axis and whose apex lies on the roll axis. The two roll sensors on the pitch axis operate exactly as before; but the signal to restore pitch is obtained by comparison of the signal from the single pitch sensor with that of an average of the two roll sensors.

I claim:

1. A system for stabilising the attitude of a hover vehicle, the system comprising a first pair of downwardly directed sensors which are mounted at spaced locations on the vehicle, each sensor being adapted to generate a ground distance signal representing the distance of the associated location from the ground, means for detecting a difference between the ground distance signals generated by respective sensors and generating an attitude signal, and means responsive to the attitude signal from the detecting means for exerting a couple to rotate the vehicle towards a predetermined angular position relative to the ground.

2. A system as claimed in claim 1, comprising means for generating a command signal representing a desired attitude for the vehicle, and means for comparing the command signal with the said attitude signal from the detecting means, the said responsive means being adapted, in response to a difference between the said command and attitude signals, to rotate the vehicle towards the desired attitude.

3. A system as claimed in claim 2, wherein the first pair of sensors are mounted at locations spaced in the direction of the pitch axis of the vehicle, the responsive means are adapted in response to the attitude signal to rotate the vehicle towards a predetermined angular position about the roll axis of the vehicle, a second pair of sensors are mounted at locations spaced in the direction of the said roll axis, the detecting means are adapted to detect a difference between ground distance signals generated by respective sensors in the second pair of sensors and to generate a second attitude signal, and the responsive means are adapted in response to the second attitude signal to rotate the vehicle towards a predetermined angular position about the pitch axis of the vehicle.

4. A system as claimed in claim 1, wherein a further sensor is mounted on a line which is perpendicular to and bisects the line joining the first pair of sensors, the detecting means are adapted to detect a difference between a ground signal generated by the further sensor and an average of the ground signals generated by respective sensors in the first pair of sensors and to generate a further attitude signal, and the responsive means are adapted in response to the further attitude signal to rotate the vehicle in a sense corresponding to removal to the said difference between the ground signal generated by the further sensor and the average of the ground signals generated by respective sensors in the first pair of sensors.

5. A system as claimed in claim 1, wherein the first pair of sensors are included in a group of three mutually spaced, collinearly arranged sensors, and the detecting means are adapted to detect a difference between the ground distance signal from the central sensor in the group and the ground distance signal from that one of the outer sensors which is the shorter distance from the ground.

6. A system as claimed in claim 1, wherein the detecting means are futher adapted to detect a rate of change in the difference between the ground distance signals generated by respective sensors, and the rotation effected by the responsive means is damped in accordance with said rate of change.

7. A system as claimed in any one of claims 1, 2, 3, 4, 5, or 6, wherein the detecting means is further adapted to generate a signal representing the height of the vehicle above the ground, and the responsive means are adapted to move the vehicle to a predetermined height above the ground.

8. A system as claimed in any one of claims 1, 2, 3, 4, 5 or 6, wherein each sensor is an ultrasonic range finder.

9. A system as claimed in any one of claims 1, 2, 3, 4, 5, or 6, for stabilising a vehicle having a bladed rotor on a generally vertical shaft, wherein the responsive means are adapted to vary the pitch of the rotor blades.

10. A system as claimed in claim 9, wherein the responsive means are adapted to vary the pitch of each rotor blade in one sense during movement of the blade through a first angular distance and in an opposite sense during movement through a second angular distance 11. A system as claimed in any one of claims 1, 2, 3, 4, 5 or 6 for stabilising a vehicle having a plurality of ducted fans, the responsive means being adapted to modulate the thrust of the fans.

12. A system as claimed in claim 9 for stabilising a vehicle having a plurality of ducted fans having adjustable vanes, the responsive means being adapted to adjust said adjustable vanes.

13. A system as claimed in any one of claims 1, 2, 3, 4, 5 or 6, wherein each sensor is an infra red range finder.

14. A system as claimed in any one of claims 1, 2, 3, 4, 5 or 6, wherein each sensor is an radar range finder.

15. A system as claimed in claim 9 for stabilizing a vehicle having a plurality of ducted fans, the responsive means being adapted to modulate the thrust of the fans.

16. A system as claimed in any one of claims 1, 2, 3, 4, 5 or 6 stabilizing a vehicle having a plurality of ducted fans having adjustable vanes, the responsive means being adapted to adjust said adjustable vanes.

17. A system for stabilizing the attitude of a hover vehicle which is adapted to hover close to the ground, said system comprising:
a first pair of downwardly directed sensors which are mounted at spaced locations on the vehicle, each sensor of this pair being adapted to generate a ground distance signal representing the distance of the associated location from the ground;
means for detecting a difference between the ground distance signals generated by the respective said sensors and generating a first command signal;
means responsive to the first command signal from the detecting means for exerting a couple to rotate the vehicle in a sense corresponding to removal of the said difference and towards a predetermined angular position relative to the ground;
a further sensor, this further sensor being mounted on a line which is perpendicular to and bisects a straight line joining the first pair of sensors, the detecting means being adapted to detect a difference between a ground signal generated by said further sensor and an average of the ground signals generated by respective said sensors in the said first pair of sensors and to generate a further command signal, and
said responsive means being adapted to rotate the vehicle in a further sense corresponding to removal of the said difference between the ground signal generated by said further sensor and an average of the ground signals generated by respective said sensors in said first pair of sensors.

18. A system for stabilizing the attitude of a hover vehicle which is adapted to hover close to the ground, said system comprising:
a first pair of downwardly directed sensors which are mounted at spaced locations on the vehicle, each sensor of this pair being adapted to generate a ground distance signal representing the distance of the associated location from the ground;
means for detecting a difference between the ground distance signals generated by the respective said sensors and generating a first command signal;
means responsive to the first command signal from the detecting means for exerting a couple to rotate the vehicle in a sense corresponding to removal of the said difference and towards a predetermined angular position relative to the ground;
said first pair of sensors being included in a group of three mutually spaced, collinearly arranged sensors; and
said detecting means being adapted to detect a difference between the ground distance signal from the central said sensor in said group and the ground distance signal from that one of the outer said sensors in said group which is a shorter distance from the ground.

19. A system for stabilizing the attitude of a hover vehicle which is adapted to hover close to the ground, said system comprising:
a first pair of downwardly directed sensors which are mounted at spaced locations on the vehicle, each sensor of this pair being adapted to generate a ground distance signal representing the distance of the associated location from the ground;
means for detecting a difference between the ground distance signals generated by the respective said sensors and generating a first command signal;
means responsive to the first command signal from the detecting means for exerting a couple to rotate the vehicle in a sense corresponding to removal of the said difference and towards a predetermined angular position relative to the ground;
said detecting means being further adapted to detect a rate of change in the difference between the ground distance signals generated by the respective said sensors; and
said responsive means being adapted to rotate the vehicle in a sense corresponding to removal of the said difference and removal of said rate of change thereof.

20. A system as claimed in any one of claims 17, 18, or 19, wherein:
said detecting means is further adapted to generate a signal representing the height of the vehicle above the ground, and said responsive means are adapted to move the vehicle to a predetermined height above the ground.

* * * * *